United States Patent [19]

Wakashima et al.

[11] Patent Number: 4,618,406
[45] Date of Patent: Oct. 21, 1986

[54] GRAPHITE-COATED TUBE AND PROCESS FOR PRODUCING THE SAME

[75] Inventors: Yoshikazu Wakashima; Sachio Shimada, both of Hitachi, Japan

[73] Assignee: Hitachi, Ltd., Tokyo, Japan

[21] Appl. No.: 443,530

[22] Filed: Nov. 22, 1982

Related U.S. Application Data

[62] Division of Ser. No. 085,232, Oct. 16, 1979, abandoned.

[30] Foreign Application Priority Data

Oct. 17, 1978 [JP] Japan ................................ 53-127725

[51] Int. Cl.⁴ .......................... C25D 13/00; G21C 3/06
[52] U.S. Cl. .................................. 204/181.1; 204/38.1; 204/181.2; 204/181.6; 376/417
[58] Field of Search ............... 376/414, 416, 418, 900, 376/417; 204/38 R, 38 A, 42, 181 R, 181 N, 38.1, 38.3

[56] References Cited

U.S. PATENT DOCUMENTS

| | | | |
|---|---|---|---|
| 3,493,482 | 2/1970 | Irwin | 204/181 R |
| 3,622,486 | 11/1971 | Brewer et al. | 204/181 R |
| 3,676,383 | 7/1972 | Scala et al. | 204/181 R |
| 3,787,305 | 1/1974 | Ballard | 204/181 N |
| 3,864,220 | 2/1975 | Denning et al. | 176/88 |
| 3,909,370 | 9/1975 | Videm et al. | 204/38 A |
| 4,093,756 | 6/1978 | Donaghy | 376/414 |
| 4,268,586 | 5/1981 | Hanneman et al. | |

FOREIGN PATENT DOCUMENTS

| | | | |
|---|---|---|---|
| 1024668 | 1/1978 | Canada | 176/82 |
| 1298578 | 6/1962 | France | 204/181 R |
| 51-55339 | 5/1976 | Japan | 204/181 R |
| 51-75741 | 6/1976 | Japan | 204/181 R |
| 51-34421 | 9/1976 | Japan | 204/181 R |
| 1048590 | 11/1966 | United Kingdom | 176/82 |

Primary Examiner—Harvey E. Behrend
Attorney, Agent, or Firm—Antonelli, Terry & Wands

[57] ABSTRACT

A graphite-coated tube, especially a cladding for nuclear fuel pellets, comprising a matrix tube of zircalloy, an oxide layer of not more than about 5,000 Å laid on an inside surface of the matrix tube, and a graphite layer of at least 5 μm laid on the oxide layer has a good resistance to peeling of the graphite layer.

14 Claims, 5 Drawing Figures

F I G. 5
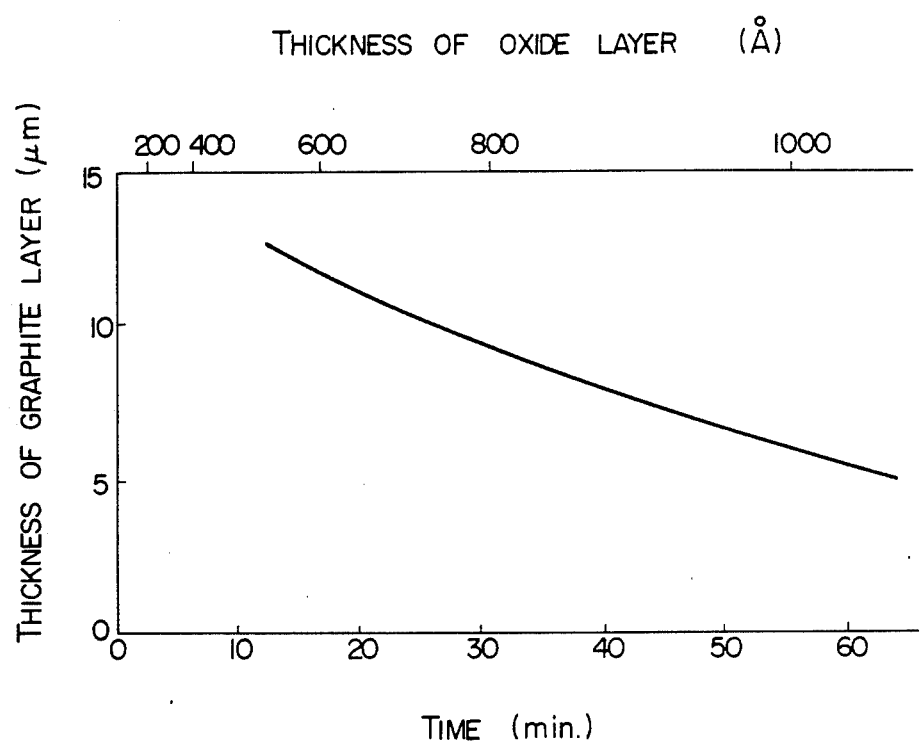

GRAPHITE-COATED TUBE AND PROCESS FOR PRODUCING THE SAME

This is a division of application Ser. No. 085,232, filed Oct. 16, 1979, now abandoned.

This invention relates to a graphite-coated tube, especially a graphite-coated cladding suitable for improving a nuclear fuel performance, and a nuclear fuel element produced from such a graphite-coated cladding, and also to process for producing the same.

In a nuclear fuel element of such a type that columnar ceramic nuclear fuel pellets, which will be hereinafter referred to as "pellets", are charged in a long cladding of zircalloy, etc. having a small diameter and a small thickness by stacking the pellets one upon another, and both ends of the cladding are tightly sealed, complicated stresses and strains are generated on the cladding, when used in a nuclear reactor, owing to overlapped causes such as a thermal deformation of pellets, an expansion of pellets by accumulation of nuclear fission products, or creeps of the cladding by cooling water pressure, etc. That is, the pellets have a large temperature gradient in a radial direction while used in the nuclear reactor, and thus a thermal stress distribution appears in the pellets, and their shapes are deformed into hyperboloids of one sheet. Therefore, peripheral ends of the pellets have an action to expand the cladding outwardly from the inside, while used in the nuclear reactor. Furthermore, the pellets are cracked by the thermal stress, and the cracks extend in a wedge form.

This mechanism will be described in detail, referring to the accompanying drawings.

FIG. 5 is a diagram showing relations between the thickness of oxide layer and graphite layer when a graphite-coated tube is produced according to the present invention.

Figure 1:
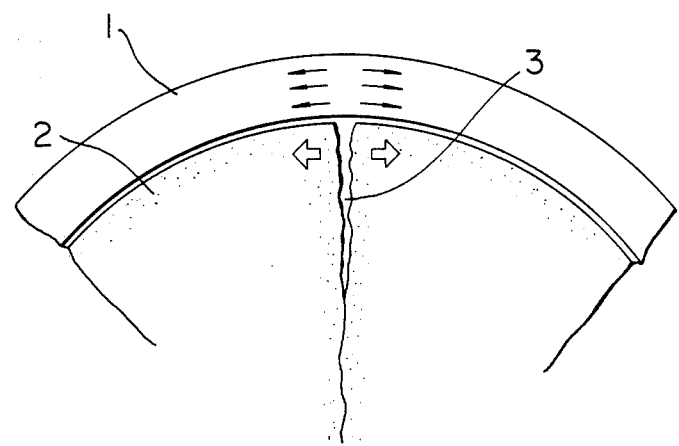
FIG. 1 is a schematic view of a mutual action between pellets in a nuclear fuel element using a cladding not provided with a graphite layer, and the cladding.

As shown in FIG. 1, a strong frictional force is developed between the inside surface of cladding 1 and the side surface of pellet 2, and the cladding 1 is locally expanded at a position facing a crack 3, of the pellet 2, developing a large stress. On the other hand, the material itself of the cladding undergoes a strong action of radiation in a nuclear reactor, and is made brittle thereby. Its ductility is also considerably lowered, as compared with that of the irradiated one. Thus, it is said that cracks are developed on the cladding by overlapping of these actions and a chemical action of fission products accumulated in the nuclear fuel element.

To prevent the damage of nuclear fuel element, various methods for making the stress as small as possible on the cladding and methods for preventing an action of the fission products upon the cladding have be proposed.

One of the methods is to use a graphite-coated cladding (Japanese Patent Publication No. 16446/63; Transactions of ANS 28 208-209).

Figure 2:
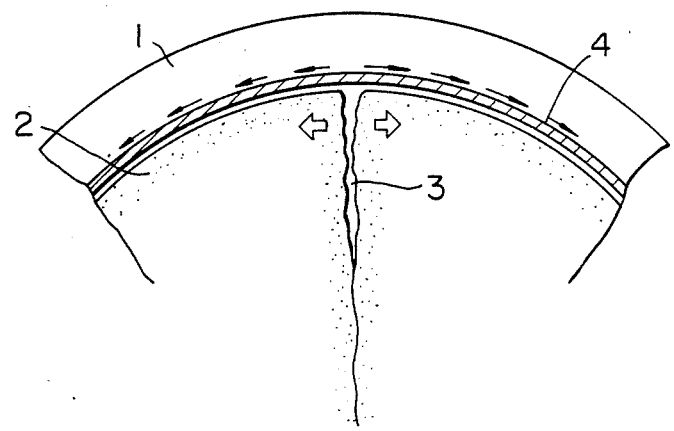
FIG. 2 is a schematic view of a mutual action between pellets in a nuclear fuel element using a graphite-coated cladding and the cladding.

In FIG. 2, the structure and mechanism of the graphite-coated cladding are illustrated, wherein numeral 1 is a cladding, 2 a pellet, and 4 a graphite layer coated on the inside surface of the cladding 1. Even if the cracked pellet 2 is deformed to expand a crack 3 in the nuclear fuel element of said structure, the cladding 1 is less expanded locally on account of a frictional force-reducing effect of the graphite layer 4 provided between the pellet 2 and the cladding 1. That is, a coefficient of friction of the cladding against the pellet will be decreased to about one-third, when a good adhesion of the graphite layer to the cladding is obtained, by coating the cladding with the graphite layer, and the degree of concentration of stress and strain on the cladding at a position facing the crack of pellet will be also decreased to about one-third thereby.

Said graphite-coated cladding can be produced by applying graphite paint to the inside surface of cladding by brush, trowel, or other means, or by coating the inside surface of cladding according to an electrophoresis method (Japanese Laid-open Patent Application No. 37434/73; Japanese Laid-open Patent Application No. 113836/74), among which the electrophoresis method is to make a coating with an electrodeposition bath of graphite particles and anionic resin solution according to the ordinary electrodeposition technique, and has a distinguished features such as a good adhesiveness of graphite layer and a good uniformness in thickness of the graphite layer, but since the graphite is coated together with the resin, a successive baking is necessary for removing the resin by oxidative decomposition.

However, when the present inventors tried to coat a cladding with a graphite layer according to the electrophoresis method, it was found that the deposition of graphite layer was poor in the case of the so-called autoclaved tube, that is, a cladding whose inside surface was subjected to an autoclave treatment with steam at 1,400° C. in advance. Furthermore, when the so-called non-autoclaved tube, that is, a cladding whose inside surface was not subjected to the autoclave treatment, was used, the deposition of graphite layer was good at the electrodeposition by electrophoresis, but the graphite layer was peeled off at the successive baking, and no practically durable graphite-coated claddings were successfully produced.

An object of the present invention is to provide a graphite-coated tube or cladding free from peeling of graphite layer from the tube or cladding, and a nuclear fuel element using said graphite-coated tube or cladding, and processes for producing the same, by overcoming the prior art drawbacks as mentioned above.

The present invention provides a graphite-coated tube which comprises a tube, an oxide layer having a thickness of not more than about 5,000 Å laid on an inside surface of the tube, and a graphite layer laid on the oxide layer.

The present invention further provides a nuclear fuel element, which comprises a cladding comprising a tube, an oxide layer having a thickness of not more than about 5,000 Å laid on an inside surface of the tube, and a graphite layer laid on the oxide layer, and nuclear fuel pellets filled in the cladding, both ends of the cladding being tightly sealed.

The present invention still further provides a process for producing a graphite-coated tube, which comprises oxidizing an inside surface of a tube, thereby forming an oxide layer on the inside surface, depositing a graphite layer on the oxide layer by electrodeposition, and baking the grapite layer-deposited tube.

The present invention furthermore provides a process for producing a nuclear fuel element, which comprises oxidizing an inside surface of a tube, thereby forming an oxide layer on the inside surface, depositing a graphite layer on the oxide layer by electrodeposition, baking the graphite layer-deposited tube, thereby preparing a cladding, filling nuclear fuel pellets therein, and tightly sealing both ends of the cladding.

Figure 3:
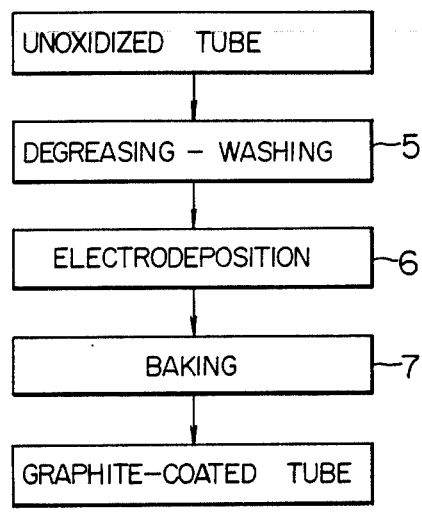
FIG. 3 is a block diagram showing the prior art process for producing a graphite-coated tube.

The present inventors have found that, when an autoclaved zircalloy tube was used as a tube for the cladding, the electrophoresis was not sufficiently carried out owing to an elevated insulating property attained by a thick oxide layer formed on the inside surface of the tube by autoclave treatment, and the deposition of graphite layer was consequently poor, whereas when an unautoclaved zircalloy tube (unoxidized tube) was used as a tube for the cladding, a good deposition of graphite layer was attained in an electrodeposition step, as shown in FIG. 3, where the process comprises a degreasing-washing step 5, an electrodeposition step 6 and a baking step 7, but the surface of zircalloy tube was oxidized in the successive baking step 7 and the surface state of the tube was changed, resulting in peeling-off of the deposited graphite layer.

Furthermore, the present inventors have found that when an unautoclaved tube was used as a matrix tube, and the tube was oxidized in advance, thereby forming a thin oxide layer on the inside surface of the tube, a good deposition of graphite layer could be obtained at the graphite electrodeposition, and no peeling of the graphite layer from the cladding took place at the baking. When the thin oxide layer was formed on the inside surface of the tube by oxidation, no great change was brought about on the surface state of the tube, even if the oxidation of the tube further proceeded by the baking, and thus the peeling of graphite layer was not brought about by baking. Thus, the desired object of the present invention could be attained thereby.

The present invention will be described in detail according to FIG. 4.

Figure 4:
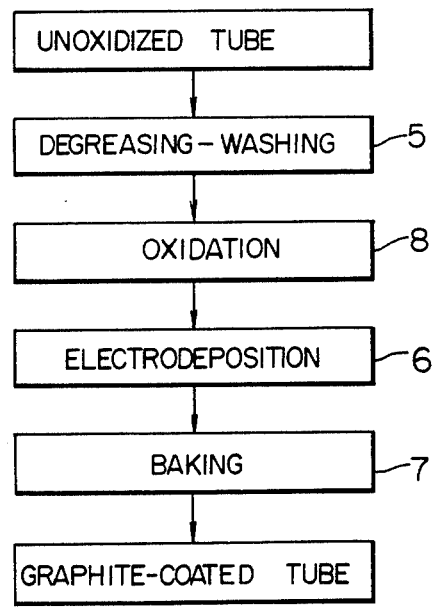
FIG. 4 is a block diagram showing the present process for producing a graphite-coated tube.

In FIG. 4, a process for producing a graphite-coated cladding applicable to a nuclear fuel element according to the present invention is shown, which comprises a degreasing-washing step 5, an oxidation step 8, an electrodeposition step 6 and a baking step 7. An unoxidized tube (matrix tube) made from zircalloy, stainless steel, iron, or the like is immersed in a solvent such as acetone in the degreasing-washing step 5 where washing is made by means of an ultrasonic wave, and then materials, etc. attached to the outer surface of the matrix tube are removed by defatted cotton, etc.

In the next oxidation step 8, the degreased and washed matrix tube is oxidized in an oxidative atmosphere, where oxidation conditions are selected so as to obtain an oxide layer having a thickness of not more than 5,000 Å, as will be described later. The oxidation can be made in the air or in an autoclave. Practically, the oxidation is carried out in the air at a temperature of 250°–350° C. for a necessary time to obtain the oxide layer having a thickness of not more than 5,000 Å. The inner and outer surfaces of the matrix tube are oxidized in this case.

In the next electrodeposition step 6, an electrodeposition of graphite onto the matrix tube whose surfaces are oxidized is carried out, where an electrodeposition bath of graphite and anionic resin at a mixing ratio of the former to the latter of 1/5–$\frac{1}{2}$ by weight is used. If the mixing ratio is less than 1/5, the thickness of electrodeposited layer is less than 5 μm, whereas, above the mixing ratio of $\frac{1}{2}$, the electrodeposited graphite layer has a coarse surface and the thickness of the graphite layer cannot be kept uniform. As the anionic resin, an electrodeposition varnish, for example, one comprising an acrylic resin, a necessary amount of additives, for example, dimethylethanolamine or triethylamine, and a necessary amount of a cross-linking agent, for example, methoxy methylmelamine, can be used. As the graphite, those having an average particle size of 0.2 μm and a maximum particle size of 2 μm can be used. The electrodeposition is carried out in said electrodeposition bath by using the matrix tube, whose surfaces are oxidized, as an anode, inserting a cathode into the matrix tube, and applying a voltage of 20–40 V between the anode and the cathode while selecting electrodeposition conditions and electrodeposition time necessary for making the resulting graphite layer have a thickness of at least 5 μm.

The matrix tube on whose inside surface the graphite and the anionic resin are electrodeposited is then heated in an oxidative atmosphere in the baking step 7 to decompose the anionic resin contained in the graphite layer by oxidation, and a graphite-coated tube is obtained thereby.

In FIG. 5, relations between the thickness of the oxide film formed in the oxidation step 8 and the thickness of graphite layer coated in the electrodeposition step 6 in the graphite-coated layer thus produced are shown, where the abscissa shows an oxidation time in minutes and a thickness of oxide layer in angstrom, and the ordinate shows a thickness of graphite layer in μm. The longer the oxidation time, the thicker the oxide layer, so long as the electrodeposition conditions are equal. That is, an electrical resistance becomes larger, and consequently the electric current becomes less in the electrodeposition step, making the graphite layer thinner.

It is seen from FIG. 5 that, if the thickness of the oxide layer formed on the surface of the matrix tube for the cladding is not more than about 5,000 Å, a thickness of the graphite layer can be at least 5 μm, which means that the resulting graphite-coated tube has an excellent effect as the cladding.

By charging pellets into the graphite-coated cladding thus prepared and tightly sealing both ends of the cladding, a nuclear fuel element can be produced.

The present invention will be described, referring to Example.

EXAMPLE

An unoxidized tube of zircalloy as a matrix tube (10 cm in diameter and 4 mm in length) was dipped in acetone as a solvent, and washed with an application of ultrasonic wave, and foreign matters attached to the inside and outside surfaces of the tube are removed by defatted cotton, whereby the matrix tube was degreased and washed.

Then, the degreased and washed matrix tube was placed in an electric furnace and heated at 300° C. for 30 minutes in the air, whereby the inside and outside surfaces of the matrix tube were oxidized, and an oxide layer of $ZrO_2$ having a thickness of 800 Å was obtained.

The matrix tube with the oxidized surfaces was electrodeposited in an electrodeposition bath comprising graphite having an average particle size of 0.2 μm and a maximum particle size of 2 μm and anionic acrylic resin (Poweron #100) at a mixing ratio of the former to the latter of 1:3.5 by weight (the electrodeposition bath containing necessary amounts of dimethylethanolamine and trimethylamine as additives and methoxymethylmelamine as a cross-linking agent) by applying an electrodeposition potential of 30 V between a cathode having a diameter of 3 mm and the matrix tube with the oxidized surfaces as an anode for one minute. A graphite layer having a thickness of about 10 μm was obtained thereby.

Then, the matrix tube having the electrodeposited graphite layer containing the anionic resin was heated in an electric furnace in the air at 300° C. for 3 hours, thereby baking the matrix tube. Then, pellets were charged into the graphite-coated cladding thus prepared, and both ends of the cladding were tightly sealed, whereby a nuclear fuel element was prepared.

In the nuclear fuel element thus prepared, no peeling of the graphite layer took place in contrast to that obtained by electrodepositing the graphite layer without oxidizing the matrix tube, followed by baking.

To test the adhesiveness of the graphite layer, a pellet was pushed manually against the graphite layer surface of the graphite-coated tube cut to halves and slid along the surface while pushing the pellet against the layer, and such procedure was repeated ten times, but no peeling of the graphite layer took place. That is, the adhesiveness of the graphite layer was found to be very excellent.

In the foregoing Example, the oxidation was carried out in the air, though simplest and most easily, but can be carried out in oxygen, or other gas phase or liquid phase oxidation with an acid can be carried out, if a rapid oxidation is required.

The present invention can be applied not only to a tubular article, but also to a plate article or articles of other shapes to prepare graphite-coated articles.

As described above, the present invention provide a graphite-coated tube or cladding free from peeling of the graphite layer from the tube or cladding, and a nuclear fuel element with a good performance, and thus has a considerable significance in the relevant industry.

What is claimed is:

1. A process for producing a graphite-coated zircalloy tube, which comprises oxidizing an inside surface of an unoxidized zircalloy tube to form a zirconium oxide layer having a thickness of not more than 5,000 Å on the inside surface, depositing a graphite layer on the zirconium layer by electrodeposition, and baking the graphite layer-deposited tube.

2. A process according to claim 1, wherein the graphite layer has a thickness of at least 5 μm.

3. A process according to claim 1, wherein the oxidation is carried out in the air at 250°-350° C.

4. A process according to claim 1, wherein the graphite electrodeposition is carried out in an electrodeposition bath comprising graphite and anionic resin at a mixing ratio of the former to the latter of 1/5-½ by weight with an application of a potential of 20-40 V between the tube as an anode and a cathode in the electrodeposition bath.

5. A process according to claim 4, wherein the graphite has an average particle size of 0.2 μm and a maximum particle size of 2 μm, and the anionic resin is an electrodeposition varnish.

6. A process according to claim 5, wherein the electrodeposition varnish comprises an acrylic resin.

7. A process according to claim 1, wherein the baking is carried out by heating the graphite layer deposited tube in an oxidative atmosphere.

8. A process for producing a nuclear fuel element, which comprises oxidizing an inside surface of an unoxidized zircalloy tube to form a zirconium oxide layer having a thickness of not more than 5,000 Å on the inside surface, depositing a graphite layer on the zirconium oxide layer by electrodeposition, baking the graphite layer-deposited tube, thereby preparing a cladding, filling nuclear fuel pellets therein, and tightly sealing both ends of the cladding.

9. A process according to claim 8, wherein the graphite layer has a thickness of at least 5 μm.

10. A process according to claim 8, wherein the oxidation is carried out in the air at 250°-350° C.

11. A process according to claim 8, wherein the graphite electrodeposition is carried out in an electrodeposition bath comprising graphite and anionic resin at a mixing ratio of the former to the latter of 1/5-½ by weight with an application of a potential of 20-40 V between the tube as an anode and a cathode in the electrodeposition bath.

12. A process according to claim 11, wherein the graphite has an average particle size of 0.2 μm and a maximum particle size of 2 μm, and the anionic resin is an electrodeposition varnish.

13. A process according to claim 12, wherein the electrodeposition varnish comprises an acrylic resin.

14. A process according to claim 8, wherein the baking is carried out by heating the graphite layer-deposited tube in an oxidative atmosphere.

* * * * *